Nov. 1, 1955   P. E. PRUTZMAN   2,722,160
REAR VIEW TRUCK MIRROR
Filed Jan. 12, 1952   2 Sheets-Sheet 2

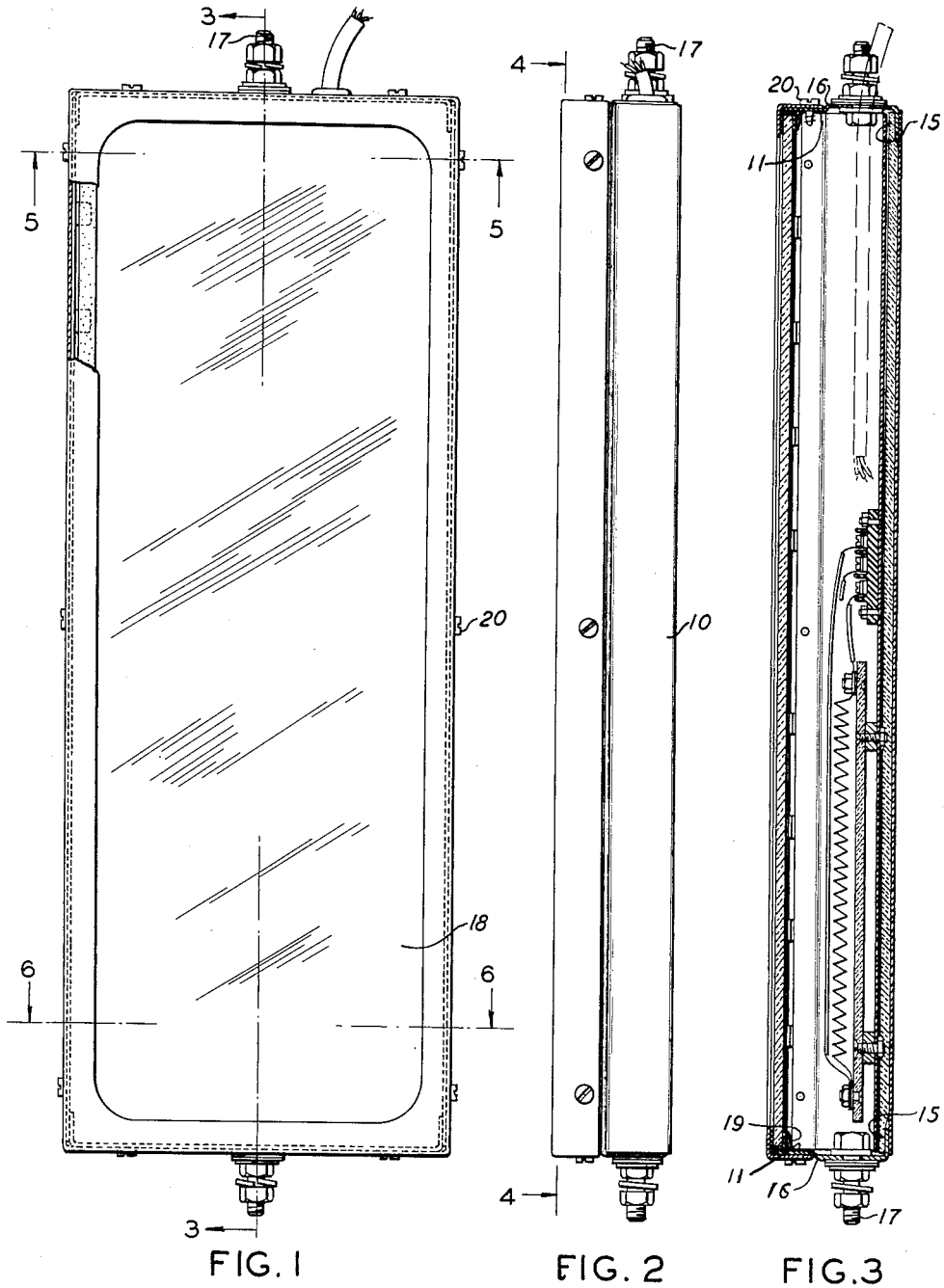

INVENTOR.
PAUL E. PRUTZMAN
BY
ATTORNEY

United States Patent Office 2,722,160
Patented Nov. 1, 1955

2,722,160

REAR VIEW TRUCK MIRROR

Paul E. Prutzman, South Gate, Calif.

Application January 12, 1952, Serial No. 266,231

7 Claims. (Cl. 88—98)

This invention relates to a mirror and retaining case adapted to be mounted at the side of an automotive vehicle to enable the driver to view a part of the road to the rear of the vehicle.

A purpose of the invention is to provide a device of the described type particularly adapted to use on automotive trucks.

A purpose of the invention is to provide a device of the described type which is capable of being readily swung to and firmly retained in the angular position in which it affords the maximum degree of road visibility.

A purpose of the invention is to provide a device of the described type in which the mirror proper is rigidly backed to protect it against the excessive vibration to which heavy duty trucks are subjected, and in which the mirror is readily removed for replacement.

A purpose of the invention is to provide a device of the described type which offers the minimum wind resistance consistent with its area.

The present application is a continuation-in-part of my copending application Serial No. 140,669, filed January 26, 1950, under the title "Rear View Mirror," now issued as Patent No. 2,585,273, February 12, 1952, and comprises improvements over the structure described and claimed in said application.

The copending application describes a structure having the same basic elements as that herein described, to-wit: a case adapted to support an outwardly facing mirror; an electrical heating element within the case, and a detachable rim element for retaining the mirror and sealing the case. The improvements over the earlier device described in the present application are, in general terms, related to:

a. Modifications of the case structure which permit it to be formed from sheet metal by die stamping and welding;

b. A modification of the mirror-supporting means which affords a resilient support for the mirror and holds it firmly against the retaining rim;

c. Modifications of the heating elements which localize the generation of heat within the lower portion of the case, thereby setting up convection currents which provide more even distribution of heat to the mirror;

d. The provision of an insulated reflecting element between the heating means and the back of the case, by which radiation to the metal of the case is prevented and the current required for heating is reduced.

These and other advantages of the modified structure will be evident on inspection of the attached drawings and the following description thereof, in which:

Fig. 1 is an elevation of the reflecting or mirror side of the structure;

Fig. 2 is a side elevation of the assembled device;

Fig. 3 is a longitudinal central section, as on the line 3—3 of Fig. 1;

Figure 4:
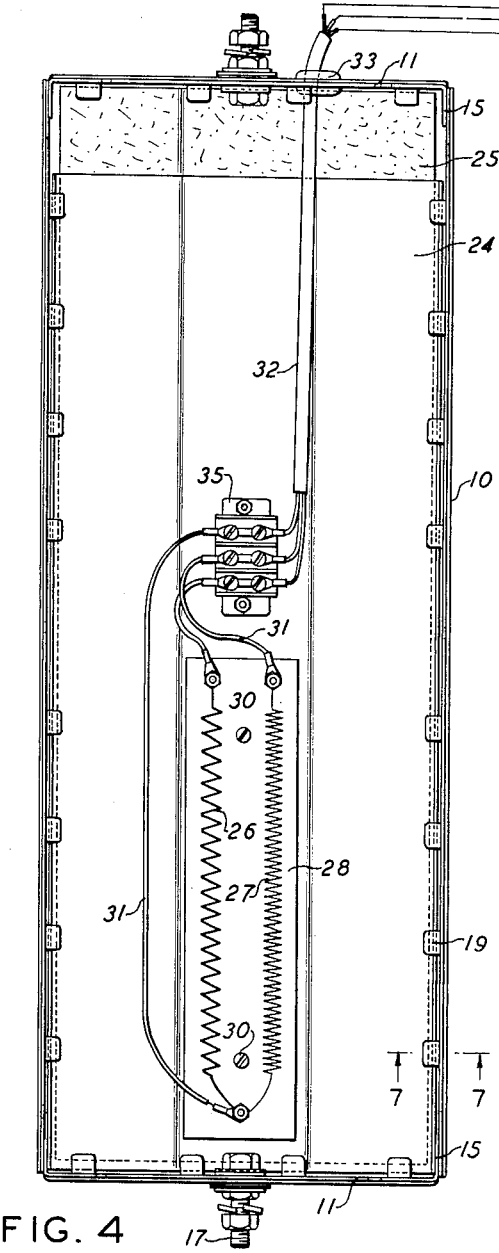
Fig. 4 is an interior elevation of the device with the mirror removed, as on the line 4—4 of Fig. 2.
Figure 5:
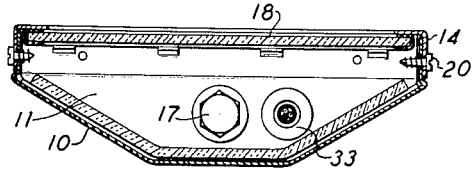
Fig. 5 is a cross-section through the upper end of the assembly, as on the line 5—5 of Fig. 1.
Figure 6:
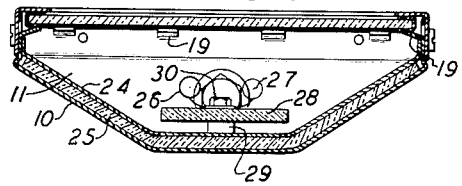
Fig. 6 is a cross-section through the lower end of the assembly, as on the line 6—6 of Fig. 1.

Referring to the drawings, the case consists of a trough-shaped longitudinal member 10 and two end plates 11—11. These members are stamped or pressed from thin sheet metal, as for example 20 cold rolled steel. The sectional form of member 10 is that of one-half of an elongated octagon, this form being stiffer than an arcuate section of the same weight metal.

Figure 7:
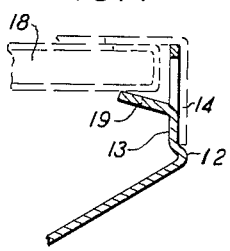
Fig. 7 is a detail showing the relation of the mirror with the mirror-supporting means, taken on the line 7—7 of Fig. 4.

At the point 12 of intersection of the side and bottom of member 10, an outwardly projecting rib is formed by crimping of the metal, as best seen in Fig. 7. This rib should have a height at least equal to and preferably slightly greater than the thickness of the side wall of the mirror retaining rim 14. This rib has been found to add materially to the stiffness of the case, permitting thinner metal to be used than would be suitable without it, but its most important advantage is in excluding water from the joint between the side wall 13 of the case and the side wall of the rim.

As the mirror is mounted to face to the rear of the vehicle, the back of the case is the advancing side and the edge of the joint moves directly into the wind. Thus any water collecting on the back of the case, by reason of rain or fog, is strongly urged to penetrate the joint to the interior of the case, even though the joint be as closely fitted as removability of the rim will permit. It is impracticable to seal the joint after the device is assembled without losing the advantage of ready removability of rim and mirror.

I have found, however, that the slight projection provided by the rib and by a corresponding projection on the end plates, causes the air to flow laterally over the advancing face and carry any entrained water over and past the minute crevice between the mating faces of the joint, thus securing complete freedom from leakage at that point with only a practicable closeness of fitting.

The end plates 11—11 are likewise formed from sheet metal by pressing or stamping, and fit inside the end of the trough member as indicated at 15 in Figs. 3 and 4. This joint may be welded or brazed as preferred, any brazing metal being applied from the inside. The end plates are provided, as at 16, with a projection aligned with rib 12 and of the same height and serving the same purpose as the rib. The end plates are further provided with openings through which studs 17—17 are passed for attachment of the assembly to the bracket, not shown, by which it is supported and on which it may be swivelled to and locked in the required angular position.

It is apparent that the trough-shaped member 10 with the two end plates 11 united thereto form an upright receptacle having a rearwardly facing open side to be closed by the mirror 18. The mirror 18 is supported within the case by lugs 19—19 which are formed from the sheet metal of the side and end walls by punching. The punch and die should be so formed that the lugs are directed upwardly at a low angle, as best seen in Fig. 7.

This method of forming the lugs has been found highly advantageous over the inwardly projected rib heretofore used. First, by controlling the shape of the punch or the length of its stroke, and without change in the die, the spacing of the lugs from the inner face of the rim may be varied to accommodate mirrors of different thickness.

Further, the upwardly bent, thin metal lugs have considerable resilience and, when properly located as to height, press the mirror upwardly against the inner face of the rim with sufficient force to prevent any possibility of chattering. The resilience of the lugs also permits the use of a very thin gasket between the glass and the rim. A more durable and a more dependably tight joint results than can be had when the supporting rib is rigid and resilience is provided by the use of a thick, soft gasket, which must be placed on the outer face of the mirror with its edge exposed to the elements.

The retaining rim 14 is formed from sheet metal, punched to expose the mirror face and with the edges bent downwardly at almost but not quite a right angle. As the adjacent edges are not joined, the sides and ends diverge slightly to facilitate the placing of the rim over the mirror, and when these sides and ends are drawn down by the insertion of suitably spaced screws 20, a close joint with the faces of the trough is produced.

With the retaining rim member 14 telescoped over the edges of the rearwardly facing receptacle, it is apparent that the side flanges and end flanges of the retaining rim member are directed forward in the direction of travel of the vehicle. Moisture is not driven under the rim flanges by the air stream, however, because the ribs 12 on the sides of the receptacle and the projections 16 on the top and bottom of the receptacle, in effect, overhang the flanges of the retaining rim member with respect to the direction of the air stream, as may be seen in Fig. 7. Thus the ribs 12 and the projections 16 function to deflect the moisture-entraining air stream away from the joint between the rearwardly facing receptacle and the retaining rim telescopically mounted thereon. Such deflection of the air stream makes it unnecessary to provide any special sealing means along this joint and permits the joint structure to be relatively simple. With the simple joint construction, it is necessary only to remove the screws to make the interior of the mirror casing accessible.

It is also to be noted that the configuration of the mirror casing with its forwardly facing walls joining its side walls at obtuse angles also favors deflection of the air stream away from the exposed joint between the receptacle and the retaining rim member. Thus in Fig. 7, the wall that receives the full impact of the air stream is inclined at an angle to deflect the air stream laterally away from the side flanges of the retaining rim member 14. In this regard, it is to be noted that the forward edges of the side flanges of the retaining rim member 14 terminate short of or rearward from the plane of the deflecting wall and therefore are out of the air stream.

Figure 8:
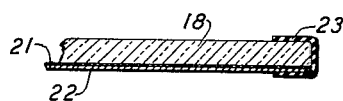
Fig. 8 is a detail illustrating a preferred form of mirror gasket.

The mirror 18, which has the usual silver coating 21 and layer of protecting paint 22, is encircled by a gasket 23, as best seen in Fig. 8. This gasket is preferably of the material known commercially as "Koroprene", a tape coated with an adhesive on the side in contact with the glass and on the other side with a mixture of a synthetic rubber and powdered cork. This tape protects the edges of the mirror from chipping while its upper surface forms a tight seal against the inner face of the retaining rim.

Inside the trough member I place a heat-reflecting element 24 of bright sheet metal, backed by a layer 25 of insulating material such as sheet asbestos. These elements are retained by insertion endwise beneath lugs 19 before end plates 11 are put in place. The reflector should be at least as long as the heating elements later described and may be longer, while the asbestos liner 25 should extend the full length of the case.

The heating element consists of two or more coils 26—27 of resistance wire, these coils being of unequal length. These coils are mounted on a slab 28 of stiff asbestos board which in turn is retained on studs 29 by screws 30, making the element readily removable.

The provision of coils in place of the straight resistance wires of the earlier application is highly advantageous, first because there is far less risk of breakage of the wires by vibration or contraction in cooling. A second and more important advantage is that the use of coils permits the localization of the heating effect in the lower portion of the case, thereby setting up convection currents which maintain the entire area of the mirror at an even temperature. Rather surprisingly, the extension of the heating elements to the entire length of the mirror, as in the earlier structure, tends to overheat the upper end and leave the lower end relatively cold.

The connecting wires 31—31 are collected in a cable 32 and passes through a rubber insulator 33 to any switch 34 which permits the coils to be used alternatively to vary the heating effect.

It is desirable, though not strictly essential, to interpose a junction block 35 in connections 31, this block being removably attached either to reflector 24 (as shown in Fig. 4) or to an extension of asbestos slab 28. The provision of this block reduces the length of unsupported connecting wires and makes it possible to remove and replace the entire heating element without withdrawing cable 32.

While the structure of the earlier application is fully functional and highly useful, that of the present application is an improvement over it in several respects, to-wit: in external appearance, being free from unsightly projections; in reduction of weight and cost of materials; in easier and cheaper fabrication; in improved tightness, leading to complete exclusion of moisture from the interior of the case, and in the ease with which such destructible elements as mirror and heating coils may be removed and replaced.

I claim as my invention:

1. A casing adapted for use on a moving vehicle in the air stream alongside the vehicle to support a rear view mirror, said casing comprising: an upright sheet metal receptacle having an open side facing rearwardly in the general direction of the air stream travel; and a retaining rim member releasably anchored to said sheet metal receptacle, said rim member being telescoped over the rim of the rearwardly facing receptacle to hold said mirror in position to close the receptacle, said rim member being of angular cross-sectional configuration with forwardly facing flanges embracing the rearwardly facing rim of the receptacle, said sheet metal receptacle having portions forward of the front edges of said rim flanges projecting laterally beyond the planes of the inner surfaces of said flanges to divert the air stream from the juncture between the receptacle and the rim flanges, thereby to prevent moisture entrained by the air stream from being driven into the juncture.

2. A casing as set forth in claim 1 in which said receptacle is apertured to form inwardly-turned tongues to cooperate with said retaining rim member to hold said mirror; and in which said flanges of the rim member cover the tongue-forming apertures of the receptacle.

3. A casing as set forth in claim 2 in which said receptacle is made of resilient sheet metal to make said tongues resilient; in which the roots of the tongues are spaced away from the mirror so that only the tips of the tongues cooperate with the rim member to hold the mirror; and in which said tongues are stressed in flexure to continuously press the mirror into firm abutment with said retaining rim member.

4. A casing adapted for use on a moving vehicle in the air stream alongside the vehicle to support a rear view mirror, said casing comprising: an upright sheet metal receptacle having an open side facing rearwardly in the general direction of the air stream travel; and a retaining rim member releasably anchored to said receptacle, said rim member being telescoped over the rim of the rearwardly facing receptacle to hold said mirror in position closing the receptacle, said rim member being of angular cross-sectional configuration with forwardly facing flanges embracing the rearwardly facing rim of the receptacle, said receptacle being apertured to form inwardly turned tongues to cooperate with said retaining rim member to hold the mirror in position, said flanges of the rim member covering the tongue-forming apertures of the receptacle, said receptacle being apertured to form inwardly turned tongues to cooperate with said retaining rim member to hold the mirror in position, said flanges of the rim member covering the tongue-forming apertures of the receptacle, said receptacle having substantially parallel flat side portions at its rearwardly facing rim and having forward walls to receive the impact of the air stream, said forward walls joining said side portions and being inclined at obtuse angles relative to the side portions, said forwardly facing flanges terminating rearward from the planes of said inclined walls whereby said inclined walls divert the air stream from the joint between the receptacle and the rim flanges, thereby to prevent moisture entrained by the air stream from being driven into the joints.

5. A casing adapted for use on a moving vehicle in the air stream alongside the vehicle to support a rear view mirror, said casing comprising: an upright sheet metal receptacle having an open side facing rearwardly in the general direction of the air stream travel; and a sheet metal retaining rim member releasably anchored to said receptacle, said rim member being telescoped over the rim of the rearwardly facing receptacle to hold said mirror in position closing the receptacle, said rim member being of angular cross-sectional configuration with forwardly facing flanges embracing the rearwardly facing rim of the receptacle, said receptacle having substantially parallel flat side portions at its rearwardly facing rim and having forward walls to receive the impact of the air stream, said forward walls joining said side portions and being inclined at obtuse angles relative to the side portions, said forwardly facing flanges terminating rearward from the planes of said inclined walls, the sheet metal of said receptacle being offset outward along the junctures of said inclined walls with said side portions to form lateral ribs extending said inclined walls at least to the planes of the outer surfaces of said side portions whereby, with respect to the direction of flow of the air stream, said inclined walls overhang the junctures between said flanges of the rim member and said side portions of the receptacle to deflect the air stream from said junctures; thereby to prevent moisture entrained by the air stream from being driven into the joints.

6. A casing adapted for use on a moving vehicle in the air stream alongside the vehicle to support a rear view mirror, said casing comprising: an upright receptacle having an open side facing rearwardly in the general direction of the air stream travel; and a retaining rim member releasably anchored to said receptacle, said receptacle being apertured to form inwardly turned tongues for abutment against the inner surface of the mirror to cooperate with said rim member being telescoped over the rim of the rearwardly facing receptacle to hold said mirror in position closing the receptacle, said rim member being of angular cross-sectional configuration with forwardly facing flanges embracing the rearwardly facing rim of the receptacle, said flanges of the rim member covering said tongue-forming aperture in the receptacle.

7. A casing as set forth in claim 6 in which said receptacle is made of resilient sheet metal to make said tongues resilient; in which said tongues are spaced away from the mirror at their roots so that only the tips of the tongues cooperate to hold the mirror; and in which said tongues are stressed in flexure to continuously press the mirror into firm abutment with said retaining rim member.

References Cited in the file of this patent

UNITED STATES PATENTS

| Number | Name | Date |
|---|---|---|
| 753,967 | Eustis | Mar. 8, 1904 |
| 1,622,068 | Thompson | Mar. 22, 1927 |
| 1,814,328 | Oestnaes | July 14, 1931 |
| 1,823,636 | Winkler | Sept. 15, 1931 |
| 1,933,173 | Hunt | Oct. 31, 1933 |
| 2,071,883 | Hodny | Feb. 23, 1937 |
| 2,504,386 | Brady, Jr. et al. | Apr. 18, 1950 |
| 2,514,647 | Jolliffe | July 11, 1950 |
| 2,564,836 | Eisenheimer | Aug. 21, 1951 |
| 2,565,256 | Myers et al. | Aug. 21, 1951 |
| 2,585,273 | Prutzman | Feb. 12, 1952 |
| 2,588,825 | Goodman et al. | Mar. 11, 1952 |